(12) United States Patent
Kulkarni et al.

(10) Patent No.: US 8,607,756 B1
(45) Date of Patent: Dec. 17, 2013

(54) INTAKE MANIFOLD

(75) Inventors: Milind B. Kulkarni, Canton, MI (US); Christopher William Newman, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/608,724

(22) Filed: Sep. 10, 2012

(51) Int. Cl.
*F02M 35/10* (2006.01)

(52) U.S. Cl.
USPC ............ 123/184.21; 123/184.34; 123/184.42; 123/184.47

(58) Field of Classification Search
USPC .............. 123/184.21, 184.38, 184.42, 184.47
See application file for complete search history.

(56) References Cited

U.S. PATENT DOCUMENTS

| | | | |
|---|---|---|---|
| 2,587,360 A | 2/1952 | Milbrath | |
| 4,425,942 A * | 1/1984 | Hage et al. | 138/38 |
| 4,648,373 A | 3/1987 | Noguchi et al. | |
| 4,805,564 A * | 2/1989 | Hudson, Jr. | 123/184.42 |
| 6,901,898 B1 * | 6/2005 | Oberg et al. | 123/184.55 |
| 7,556,031 B2 | 7/2009 | Russell | |
| 2003/0101957 A1* | 6/2003 | Benson et al. | 123/184.34 |
| 2005/0005888 A1* | 1/2005 | Brassell et al. | 123/184.31 |
| 2005/0051138 A1* | 3/2005 | Haley et al. | 123/468 |
| 2010/0031912 A1 | 2/2010 | Rolland et al. | |

* cited by examiner

*Primary Examiner* — Lindsay Low
*Assistant Examiner* — Charles Brauch
(74) *Attorney, Agent, or Firm* — Julia Voutyras; Alleman Hall McCoy Russell & Tuttle LLP (57) ABSTRACT

Embodiments in accordance with the present disclosure may provide an intake manifold that may include a plastic shell defining an intake passage in fluidic communication with a runner configured to pass inlet air to a combustion chamber. The runner may have a substantially flat inner surface. The intake manifold may also include one or more ribs disposed along the inner surface. The one or more ribs may have a length extending along a portion of the inner surface in a direction substantially corresponding to a flow direction in order to reduce NVH while maintaining reducing overall volume of the manifold.

20 Claims, 6 Drawing Sheets

INTAKE MANIFOLD

FIELD

The present application relates generally to intake manifolds, and systems for intake manifolds.

BACKGROUND AND SUMMARY

Manifolds may be used to control flow. For example, a stream of air may be divided into a number of separate streams. In the case of an intake manifold for use with an internal combustion engine, the separated streams may be passed toward a corresponding number of combustion chambers of a multi-cylinder internal combustion engine. Intake manifolds occupy space in the engine compartment, and they must be constructed strong enough to withstand strong and changing differential pressures on the walls that form flow passages therein. They must also be stiff enough to avoid excessive vibration that may contribute to engine NVH (Noise, Vibration, and Harshness). Intake manifolds typically include circular runners for strength. However, circular runners add length and/or depth to the manifold. Runners with flat sections tend to be weak and prone to vibration. External ribs extending substantially parallel to the external surfaces may be used to add strength and stiffness. However, these external ribs add to the overall volume occupied by the manifold in the engine compartment.

U.S. Pat. No. 2,587,360 to Milbrath discloses an intake manifold with internal vanes. These vanes are located where the air is divided between manifold branches to control erratic turbulence. However, even with turbulence reduced, a manifold with flat portions can still cause excessive NVH.

The inventors herein have taken an approach that reduces the space taken up by the intake manifold while still avoiding excess NVH. Embodiments in accordance with the present disclosure may provide an intake manifold that may include a plastic shell defining an intake passage in fluidic communication with a runner configured to pass inlet air to a combustion chamber. The runner may have a substantially flat inner surface. The intake manifold may also include one or more ribs disposed along the inner surface. The one or more ribs may have a length extending along a portion of the inner surface in a direction substantially corresponding to a flow direction.

In this way, flat portions of the runners may be made stronger by the one or more ribs disposed along the inner surface with little to no disruption to the flow. In this way embodiments in accordance with the present disclosure may provide an intake manifold having a number of runners with substantially rectangular cross sections. The substantially rectangular cross sections may reduce the overall, height, i.e. thickness, of the manifold. In addition, some embodiments in accordance with the present disclosure may include runners that at least partially overlap in a vertical direction. In this way the overall length of the manifold may be reduced.

The present disclosure may use perspective-based descriptions such as up/down, back/front, and top/bottom, and/or orientation-based descriptions such as height, width, length and thickness. Such descriptions may be used to describe presently disclosed embodiments, and/or may be used in the description of other disclosures in a comparative way, and may merely be used to facilitate the discussion and are not intended to restrict the application of embodiments disclosed herein.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 are drawn approximately to scale, although other relative dimensions may be used, if desired.

DETAILED DESCRIPTION

The following description relates to an intake manifold having one or more internal ribs configured in conjunction with a layered assembly and external ribs. The manifold may be configured to be relatively thin as measured in a direction substantially perpendicular to a plane wherein at least two or more runners are fluidically coupled with an intake passage. The manifold may be an intake manifold, or other type of manifold. The runners may have substantially rectangular cross sections at least along part of their length. The runners may include one or more substantially flat sections. The runners may include, at least along the substantially flat sections, at least one rib. In this way the runners may be stiffened which may, for example minimize vibration thereof. In this way noise, vibration and harshness may be reduced.

Figure 1:
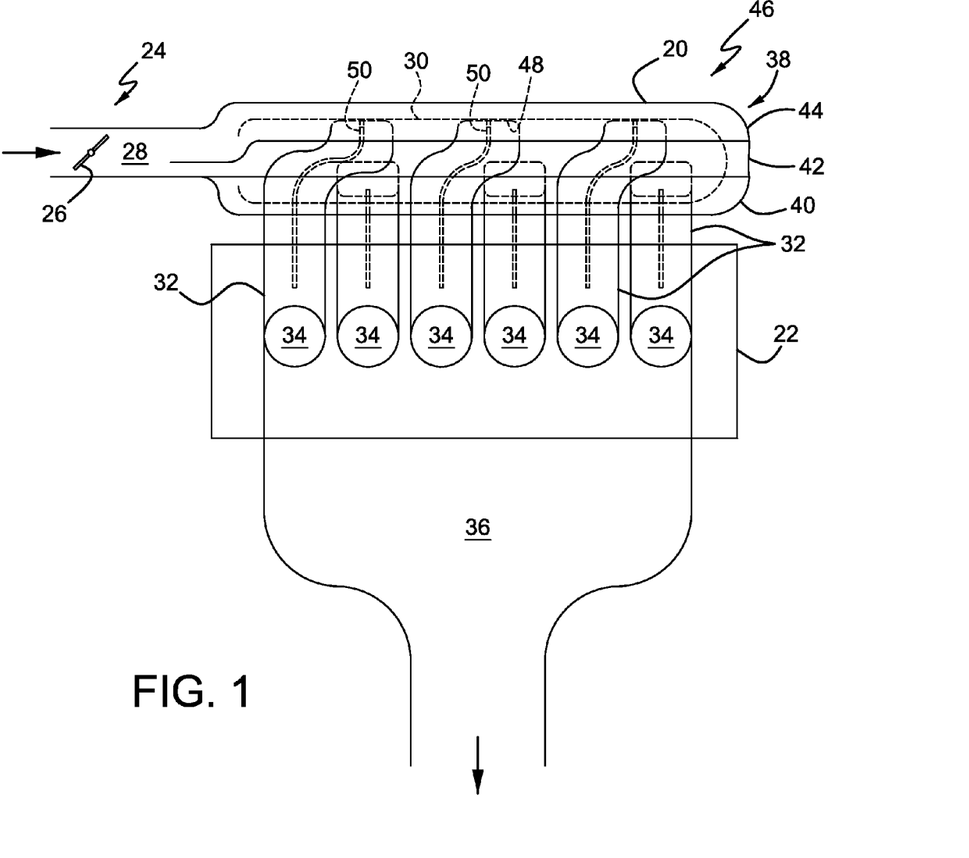
FIG. 1 is a system view of an intake manifold in accordance with the present disclosure.

FIG. 1 is a schematic diagram illustrating example elements of an internal combustion engine in accordance with the present disclosure. The elements may include an intake manifold 20 and an engine block 22. Intake manifold 20 is shown communicating with throttle body 24 via throttle plate 26 via an air passageway 28. In this particular example, throttle plate 26 may be coupled to an actuator such as an electric motor (not shown) so that the position of throttle plate 26 may be controlled by a controller, for example, via the electric motor. This configuration is commonly referred to as electronic throttle control (ETC) which may also be utilized during idle speed control. In an alternative embodiment (not shown), which is well known to those skilled in the art, a bypass air passageway may be arranged in parallel with throttle plate 26 to control inducted airflow during idle speed control via a throttle control valve positioned within the air passageway 28.

The air passageway 28 may be configured to pass intake air to the intake manifold 20. The intake manifold 20 may include an intake passage 30 configure to receive the intake air. The intake manifold 20 may also be configured to divide the intake air into a number of individual air flows via a corresponding number of runners 32. The runners 32 may each be respectively coupled with a corresponding number of combustion chambers 34 illustrated here schematically with circles. Each combustion chamber 34 may also receive fuel for combustion via, for example, a corresponding number of fuel injectors. The combusted air fuel mixture may be expelled via an exhaust manifold 36. Six runners 32, and six combustion chambers 34, are illustrated in this example. In other examples, other numbers of runners may be used, and/or other numbers of combustion chambers.

The intake manifold 20 may include a number of formed pieces 38 which may be assembled together to form the assembled manifold 20. For example, three formed pieces, i.e. a first formed piece 40, a second formed piece 42, and a third formed piece 44 may be stacked and/or otherwise joined to form an assembly 46.

Each of the formed pieces 38 may be formed separately, and/or individually by for example, via molding, and/or stamping, and the like. For example, they may be made from injection molded plastic. Each formed piece 38 may have a first side and a second side exposed during the formation process thereof. In this way a substantially high level of detail and number of surface feature may be included on multiple surfaces in the assembly. Three formed pieces 40, as illustrated in the example shown, may therefore provide six possible sides wherein multiple features may be selectively and readily included inside the assembled manifold. In this way, superior internal features may be included in the manifold, and an overall improved manifold may be achieved.

The runners 32 may include interior walls 48. One or more of the interior walls 48 may include one or more ribs 50. The ribs 50 may be configured to add strength, or stiffness and the like. The ribs may be formed into the formed pieces 38 before the runners 32 are formed in the assembly 46.

Figure 2:
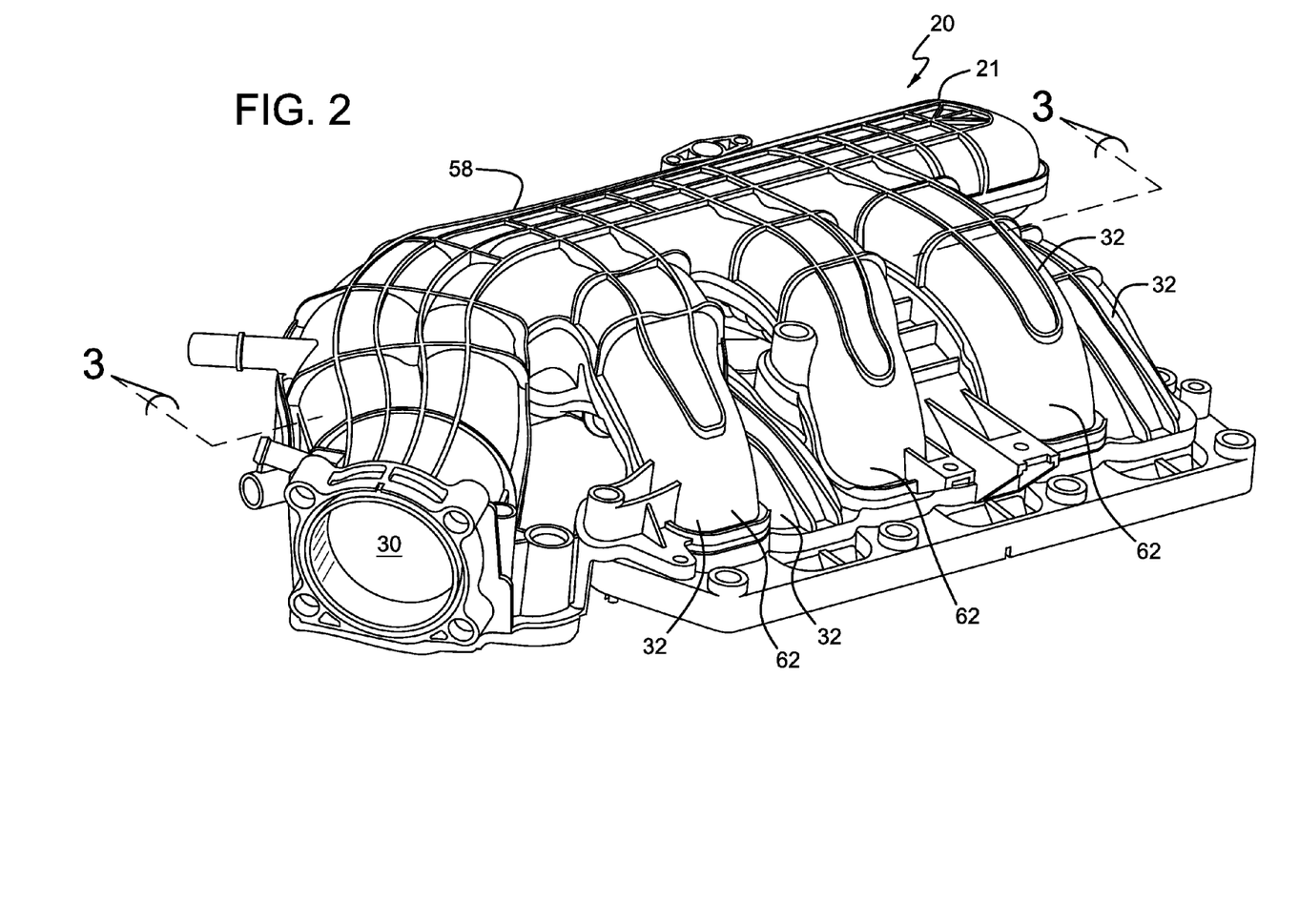
FIG. 2 is an assembled view of an intake manifold in accordance with the present disclosure.
Figure 3:
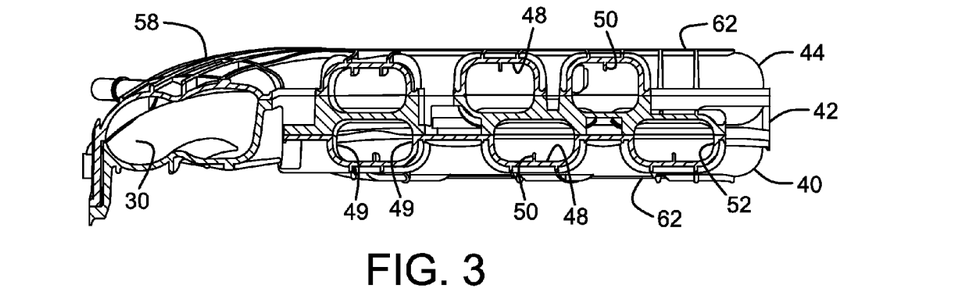
FIG. 3 is a sectional view of the intake manifold shown in FIG. 2 taken at the line 3-3.
Figure 4:
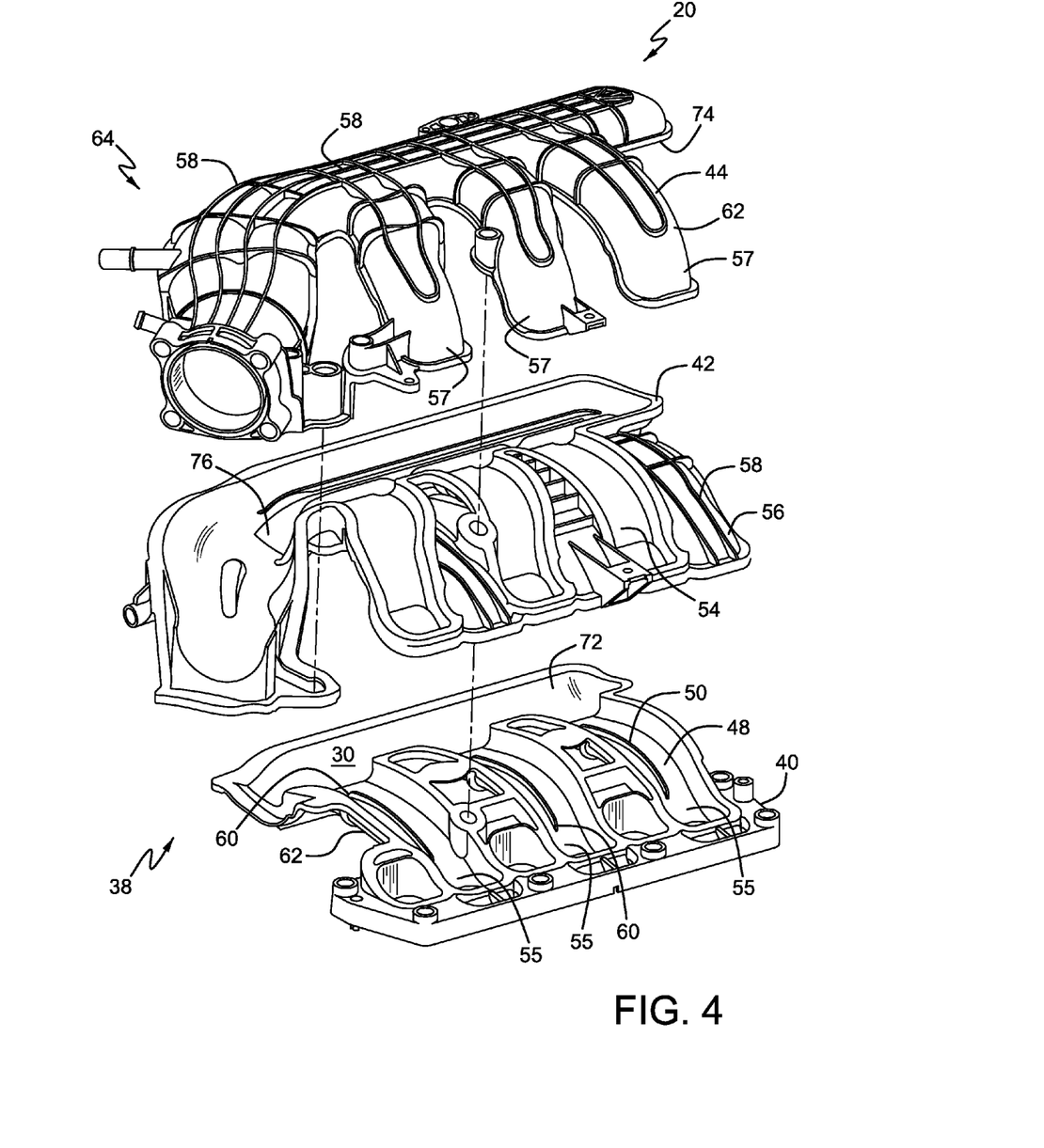
FIG. 4 is an exploded view of the intake manifold shown in FIG. 2 illustrating a top piece, a middle piece, and a bottom piece.

FIG. 2 is an assembled view of an example intake manifold 20 in accordance with the present disclosure; FIG. 3 is a sectional view of the intake manifold 20 taken at the line 3-3 in FIG. 2; and FIG. 4 is an exploded view of the intake manifold 20. The intake manifold 20 may include a plastic shell 21 defining an intake passage 30 in fluidic communication with one or more runners 32 configured to pass inlet air to a combustion chamber, the one or more runners 32 may have a substantially flat interior wall 48, or inner surface 48. One or more ribs 50 may be disposed along the inner surface 48. The one or more ribs 50 may have a length extending along a portion of the inner surface 48 in a direction substantially corresponding to a flow direction. The one or more ribs may be one or more contoured ribs.

The intake manifold 20 may also include additional runners 32 in fluidic communication with the intake passage 30 for a total of four or more runners 32, for example six runners 32. Each runner 32 may be configured to pass intake air to corresponding combustion chambers. The four or more runners 32 may each have substantially rectangular cross sections 52, as best seen in FIG. 3, along at least a portion thereof. Each runner 32 may include one or more ribs 50 disposed along respective inner surface 48 thereof.

Each rib 50 may be located approximate halfway between side walls 49 of each respective runner 32, and may extend, for example at least 10 percent of a height, as measured of each runner into the respective runner as may be measured in a direction substantially perpendicular to the plane wherein at least two or more runners 32 may be fluidically coupled with the intake passage 28. One or more runners may include two or more ribs. The two or more ribs may be evenly spaced and/or arranged in accordance with the flow characteristics.

The least two of the runners 32 may be substantially aligned vertically with each other near the intake passage and they extend in nonparallel directions to become non-aligned at an outlet end. In this way space may be saved, and or the runners 32 may provide strength, and/or stiffening to one another.

Figure 5:
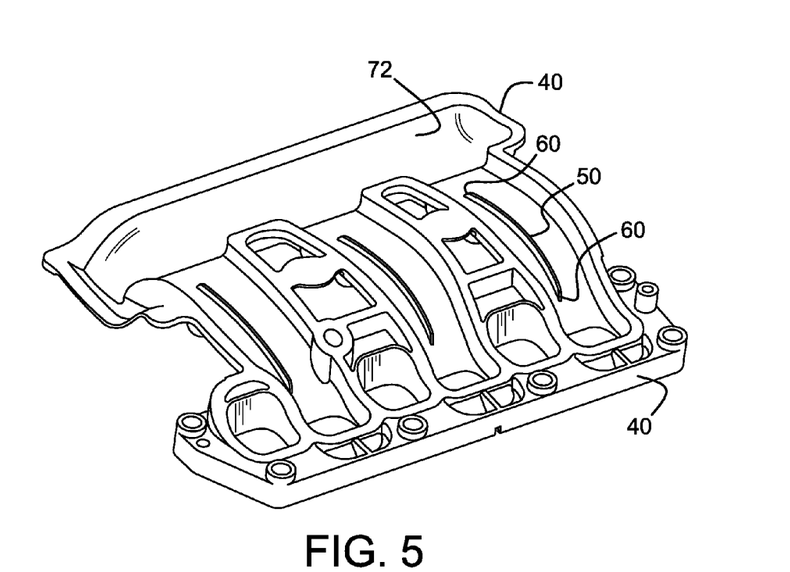
FIG. 5 is a top perspective view of the bottom piece of the manifold shown in FIG. 2 illustrating the inner contours of the bottom piece.
Figure 6:
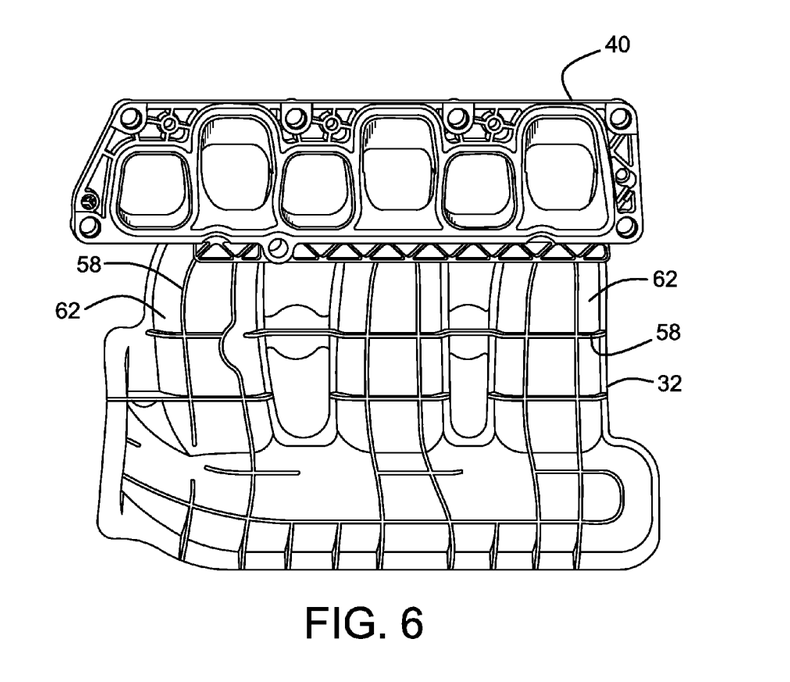
FIG. 6 is a bottom view of the bottom piece of the manifold shown in FIG. 2 illustrating the bottom surfaces of the bottom piece.
Figure 7:
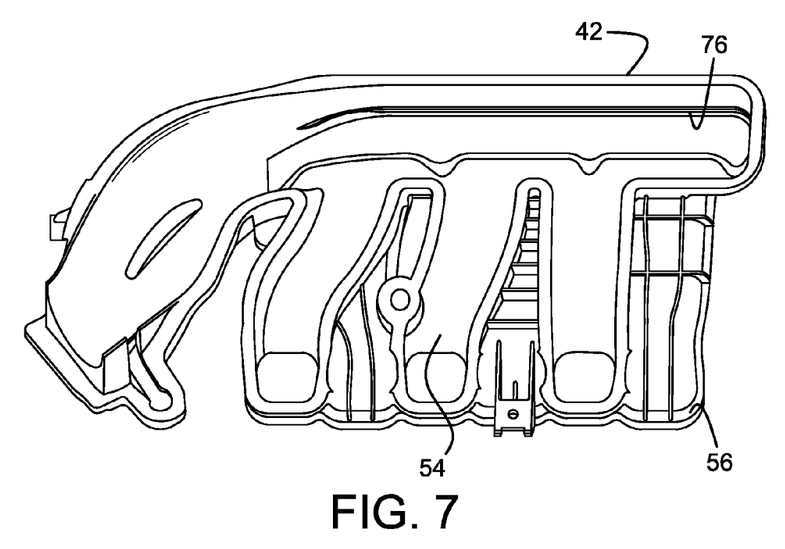
FIG. 7 is a top view of the middle piece of the manifold shown in FIG. 2 illustrating a portion of the inner contours of the middle piece.
Figure 8:
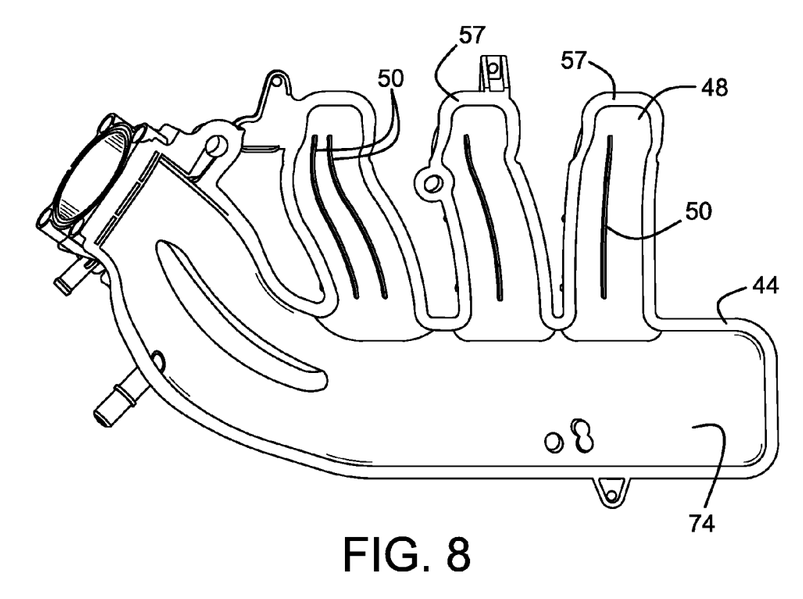
FIG. 8 is a bottom view of the top piece of the manifold shown in FIG. 2 illustrating the inner contours of the top piece.

FIG. 5 is a top perspective view of a first, or bottom piece 40; and FIG. 6 is a bottom view of the first, or bottom, piece 40 of the manifold 20. FIG. 7 is a top view of a second, or middle, piece 42 of the manifold 20; and FIG. 8 is a bottom view of a third, or top, piece 44 of the manifold 20. The first, second and third pieces may be formed pieces 38 assembled in three layers to form the intake manifold 20. The middle formed piece 42 may form a bottom portion 54 of some of the runners 32 and a top portion 56 of other of the runners 32. The one or more ribs 50 may be disposed on only a top and a bottom of the three formed pieces 38. The two or more runners 32 extending from the intake passage 30 may be formed from an assembly of formed pieces 38 in a stacked configuration. The top, middle, and bottom pieces 40, 42, 44 may be made of a molded plastic material and the ribs 50 may be made integrally with the top piece 40 and the bottom piece 44.

The one or more ribs 50 may be located on inner surfaces 48 of external walls 62 of the intake manifold 20, i.e. on the inside of walls that are at the outmost extent of the manifold 20. In this way they may be included in portions of the manifold that may need additional strength, and/or need stiffening. The intake manifold 20 may also include one or more external ribs 58, for example external stiffening ribs, on an outside surface 62 of the intake manifold 20. The external ribs may be thinner, yet longer, than internal ribs. In this way the internal ribs 50 and the external ribs 58 may be configured to work together as a stiffening, or strengthening, system for the manifold 20 while enabling the manifold 20 to occupy a relatively small volume in the engine compartment.

In some examples the one or more ribs 50 may ramp away from the inner surface 48 at an upstream side to a top surface of the one or more ribs and ramp toward the inner surface 48 at a downstream side. This may be best illustrated in FIG. 5. At least some of the ribs include a ramping portion 60 at either end thereof extending from the inside surface of the runner to the top surface of the rib 50.

Various embodiments may provide an intake manifold 20 including two or more runners 32 extending from an intake passage 30 that may be configured to pass intake air toward two or more respective combustion chambers along respective runner flow directions. The two or more runners 32 may include at least one exterior runner wall 62. The intake manifold 20 may also include a rib 50 formed on an interior surface 48 of each exterior runner wall 62. Each rib 50 may be oriented in the respective runner flow directions.

The intake manifold 20 may include a top piece 44, a middle piece 42 configured to be coupled with the top piece 44, and a bottom piece 40 configured to be coupled with the middle piece 42. The middle piece 42 may include top portions 56 of three of the two or more runners 32 and bottom portions 54 of three other of the two or more runners 32. The exterior runner wall 62 of each runner 32 may be part of either the top piece 44 or the bottom piece 40. Each exterior runner wall 62 may be an exterior wall of the intake manifold 20.

Various embodiments may provide a system 64 for an intake manifold 20. The system 64 may include a first formed piece 40 including two or more first runner portions 55 extending from the inlet 30. A first formed piece rib 50 may be formed on an inside wall 48 of each a first formed piece first runner portion 55.

The system 64 may also include a second formed piece 42 including two or more second runner portions 56 extending from the inlet 30, and two or more third runner portions 54 extending from the inlet 30. Each respective first and second runner portions 55, 56 may be configured to couple together to form respective two or more formed runners 32 extending from the inlet 30, and may be configured such that an air flow passed through the formed runners will flow in a direction of each respective first formed piece rib 50.

A third formed piece 44 may include two or more fourth runner portions 57 extending from the inlet 30. A third formed piece rib 50 (FIG. 8) formed on an inside wall 48 of each fourth runner portion 57. Each respective third and fourth runner portions 54, 57 may be configured to couple together to form respective two or more additional formed runners 32 extending from the inlet 30, or intake passage 30, and configured such that an air flow passed through the formed additional runners 32 will flow in a direction of each respective third formed piece rib 50. Additional ribs may be located on one or more external walls 62 of the formed pieces 38 and may be configured to cooperate with the first and third formed piece ribs 50 to stiffen the intake manifold 20 when assembled.

The inlet 30 may be an elongate hollow chamber open at an inlet end and in fluidic communication with the formed runners and the additional formed runners. A first side wall 72 of the hollow chamber may be formed by the first formed piece 40, and a second side wall 74 of the hollow chamber may be formed by the third formed piece 44. The second formed piece 42 may include a hole 76 providing fluidic communication from the first side wall 72 to the second sidewall 74. The first side wall 72 may be a bottom wall of the inlet 30 and the second side wall 74 may be a top wall of the inlet 30.

The first formed piece rib may be formed on the inside wall of each first runner portion and the third formed piece rib 50 may be formed on the inside wall of each fourth runner portion are formed on substantially flat sections of each inside wall. The first formed piece rib 50 and the third formed piece rib 50 may be formed on inside walls that are on respective opposite sides of external walls 62 of the intake manifold when assembled, wherein the external walls may define a desired maximum extent of at least a portion of a volume to be occupied by the intake manifold within an engine, or engine compartment. Further, the inner ribs may be aligned with external ribs on the same runner along the length of the ribs in the flow direction, although they may be offset from one another in a direction of the width of the ribs, with width perpendicular to the length. The height of the internal and external ribs may also differ, with the internal ribs extending away from the inner surface to a greater, or lesser, amount than the external ribs extend away from the external surface.

By applying a layered structure, it is possible to form both internal and external ribs on one or more runners while still retaining flexible and low-cost manufacturing, since even the internal ribs can be formed an the external side of a component before it is assembled. For example, each of the three layers may include ribs on both sides of the piece, so that both internal and external ribs are provided for each of the runners, in one example.

Various example embodiments may include a method of constructing an intake manifold. One example method may include configuring pieces to be layered into an assembly to form an intake passage and runners between opposite and spaced apart surfaces of the pieces. The method may also include forming internal ribs on at least some surfaces configured to be inside the assembled intake runners in an orientation in line with a flow direction of intake air to be passed through the intake runners. The layering the formed pieces into an assembly may include layering three pieces. Some examples may use a different number of pieces.

Some example methods may also include layering the formed pieces into an assembly. The forming internal ribs may include forming the stiffened ribs inside external walls of an assembled intake manifold wherein at least a portion of the external surface of the walls are at or substantially close to a desired maximum extent of a volume to be occupied by the intake manifold within an engine.

The configuring pieces to be layered may include molding the pieces in a plastic molding operation. The forming internal ribs on at least some surfaces may include molding the internal ribs integrally with the pieces in the plastic molding operation.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An intake manifold, comprising:
a plastic shell defining an intake passage fluidically communicating with a runner configured to pass air flow to a combustion chamber, the runner having a substantially flat inner surface; and
one or more ribs disposed along and extending away from the inner surface and into the air flow, the ribs having a length extending along a portion of the inner surface in a direction substantially corresponding to a flow direction.

2. The intake manifold of claim 1, wherein the one or more ribs are one or more contoured ribs.

3. The intake manifold of claim 1, further comprising additional runners in fluidic communication with the intake passage for a total of four or more runners each configured to pass intake air to corresponding combustion chambers, and wherein the four or more runners each have substantially rectangular cross sections along at least a portion thereof, and wherein each runner includes one or more ribs disposed along respective inner surfaces thereof.

4. The intake manifold of claim 3, further comprising three formed pieces assembled in three layers to form the intake manifold, and wherein a middle of the formed pieces forms a bottom portion of some of the runners and a top portion of other of the runners.

5. The intake manifold of claim 4, wherein the one or more ribs are disposed on only a top piece and a bottom piece of the three formed pieces.

6. The intake manifold of claim 1, further comprising one or more external ribs on an outside surface of the intake manifold, the outside surface opposite to and opposing the inner surface.

7. The intake manifold of claim 1, wherein the one or more ribs ramp away from the inner surface at an upstream side to a top surface of the one or more ribs and ramp toward the inner surface at a downstream side.

8. An intake manifold comprising:
two or more runners extending from an intake passage configured to pass intake air toward two or more respective combustion chambers along respective runner flow directions, the two or more runners including at least one exterior runner wall; and a rib formed on an interior surface of each exterior runner wall, each rib extending into the intake air passing through the runner and oriented in the respective runner flow directions.

9. The intake manifold of claim 8, including a top piece, a middle piece configured to be coupled with the top piece, and a bottom piece configured to be coupled with the middle piece, wherein the middle piece includes top portions of three of the two or more runners and bottom portions of three other of the two or more runners.

10. The intake manifold of claim 9, wherein the exterior runner wall of each runner is part of either the top piece or the bottom piece, and wherein each exterior runner wall is an exterior wall of the intake manifold.

11. The intake manifold of claim 9, wherein the top, middle, and bottom pieces are made of a molded plastic material and the ribs are made integrally with the top piece and the bottom piece.

12. The intake manifold of claim 8, wherein each rib is located approximately halfway between side walls of each respective runner, the side walls being side walls of the same runner, and wherein each rib extends at least 10 percent of a height of each runner into the respective runner.

13. The intake manifold of claim 8, wherein at least two of the runners are substantially aligned vertically with each other near the intake passage and extend in nonparallel directions to become non-aligned at an outlet end.

14. The intake manifold of claim 8, wherein the two or more runners extending from the intake passage are formed from an assembly of formed pieces in a stacked configuration, and further comprising external stiffening ribs on external surfaces of the assembly of formed pieces, the external stiffening ribs configured to function cooperatively with the ribs formed on the interior surfaces to add rigidity to the assembly of formed pieces, the external ribs being thinner than the internal ribs.

15. The intake manifold of claim 8, wherein at least some of the ribs include a ramping portion at either end thereof extending from an inside surface of the runner to a top surface of the rib.

16. A system for an intake manifold comprising:
a first formed piece including two or more first runner portions extending from an inlet, a first formed piece rib formed on an inside wall of each first runner portion;
a second formed piece including:
two or more second runner portions extending from the inlet, and
two or more third runner portions extending from the inlet;
each respective first and second runner portions configured to couple together to form respective two or more formed runners extending from the inlet, and configured such that an air flow passed through the formed runners will flow in a direction of each respective first formed piece rib and each first formed piece rib located between side walls of a same runner of the formed runners and extending away from each respective inside wall and into the air flow passed through the formed runners;
a third formed piece including two or more fourth runner portions extending from the inlet, a third formed piece rib formed on an inside wall of each fourth runner portion; and
each respective third and fourth runner portions configured to couple together to form respective two or more additional formed runners extending from the inlet, and configured such that an air flow passed through the formed additional runners will flow in a direction of each respective third formed piece rib and each third formed piece rib located between side walls of a same runner of the formed additional runners and extending away from each respective inside wall and into the air flow passed through the formed additional runners.

17. The system of claim 16, wherein the inlet is an elongate hollow chamber open at an inlet end and in fluidic communication with the formed runners and the additional formed runners, and
wherein a first side wall of the hollow chamber is formed by the first formed piece, and
wherein a second side wall of the hollow chamber is formed by the third formed piece, and
wherein the second formed piece includes a hole providing fluidic communication from the first side wall to the second sidewall.

18. The system of claim 16, further comprising additional ribs on one or more external walls of the formed pieces configured to cooperate with the first and third formed piece ribs to stiffen the intake manifold when assembled.

19. The system of claim 16, wherein the first formed piece rib formed on the inside wall of each first runner portion and the third formed piece rib formed on the inside wall of each fourth runner portion are formed on substantially flat sections of each inside wall.

20. The system of claim 16, wherein the first formed piece rib and the third formed piece rib are formed on inside walls that are on respective opposite sides of external walls of the intake manifold when assembled, wherein the external walls define a desired maximum extent of at least a portion of a volume to be occupied by the intake manifold within an engine.

* * * * *